Oct. 29, 1940.  A. T. COOPER ET AL  2,219,512
DEVICE FOR SURVEYING DRILLED HOLES
Filed March 21, 1938   4 Sheets-Sheet 1
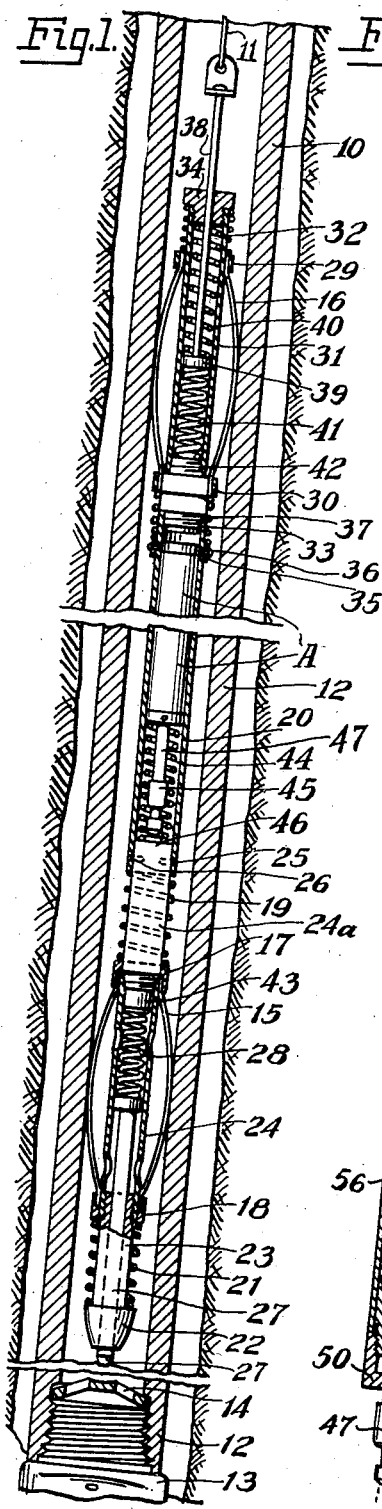
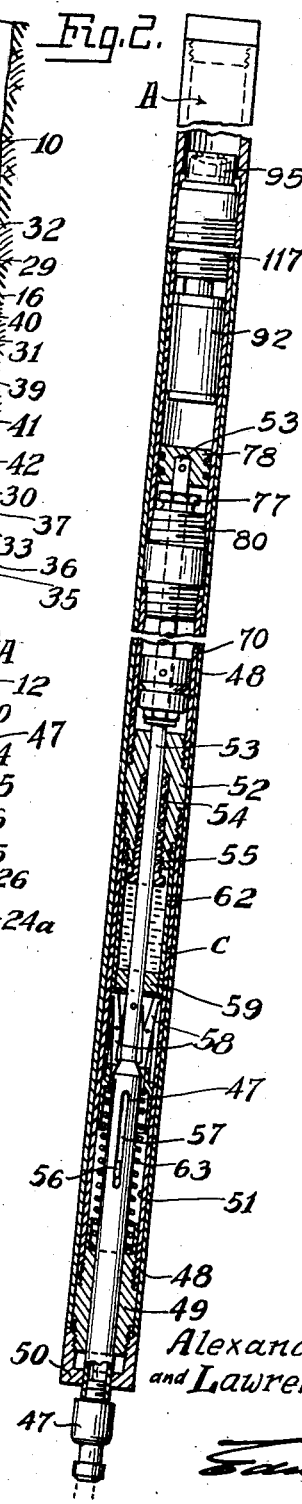
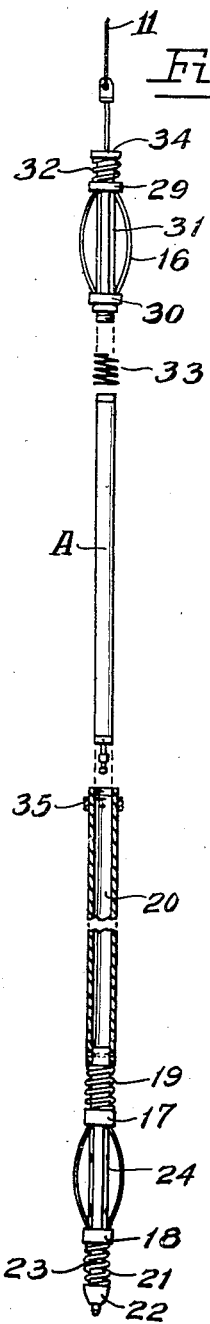
Alexander T. Cooper INVENTORS
and Lawrence F. Valentine
BY
ATTORNEY.

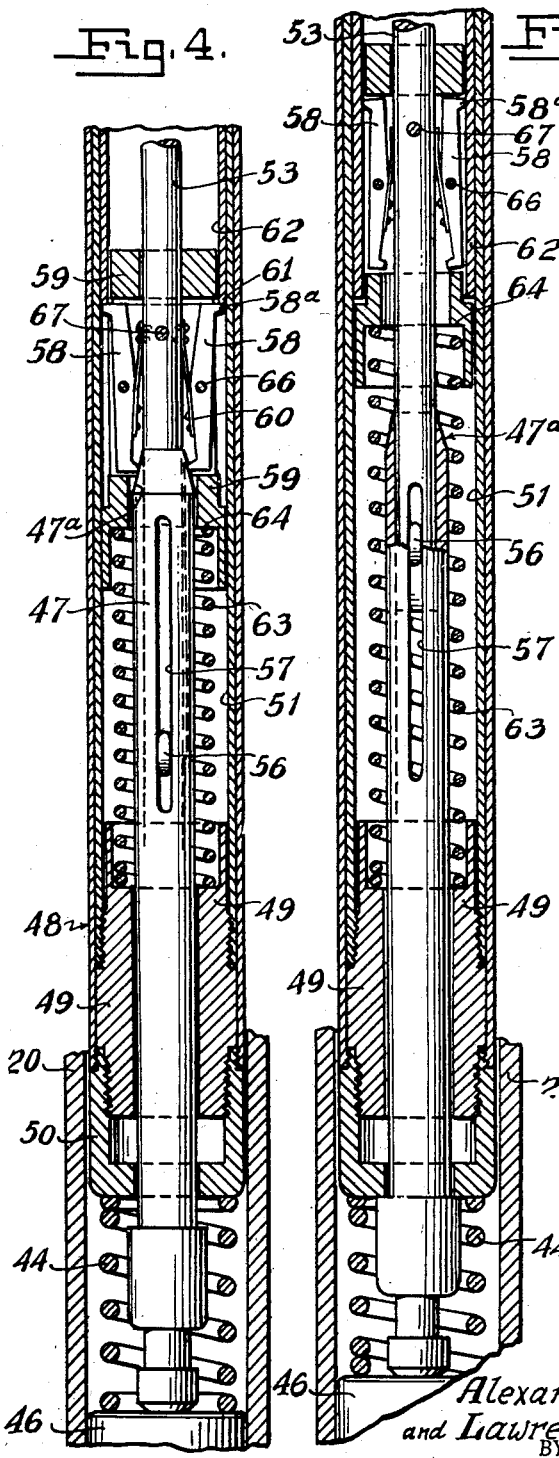

Oct. 29, 1940.   A. T. COOPER ET AL   2,219,512
DEVICE FOR SURVEYING DRILLED HOLES
Filed March 21, 1938   4 Sheets-Sheet 3
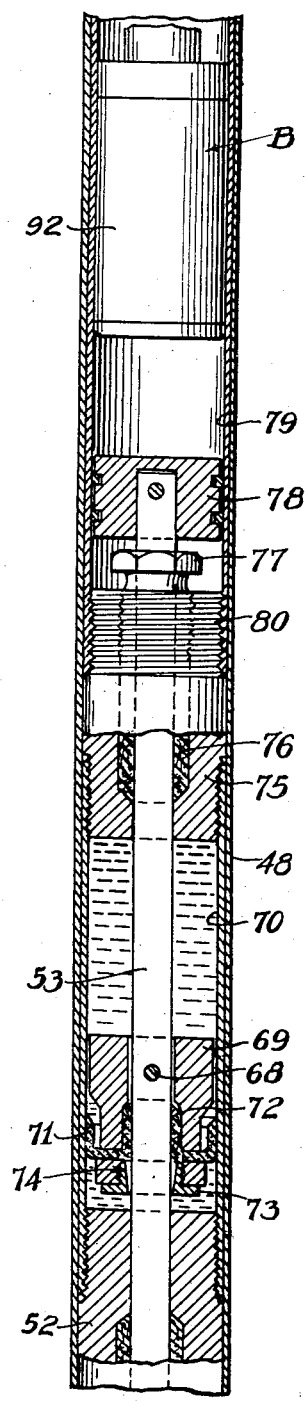
Fig. 9.
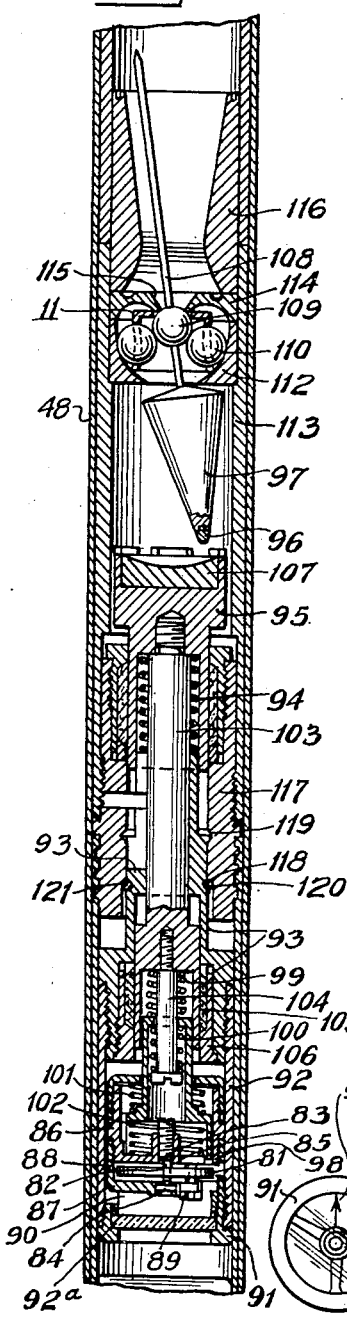
Fig. 10.
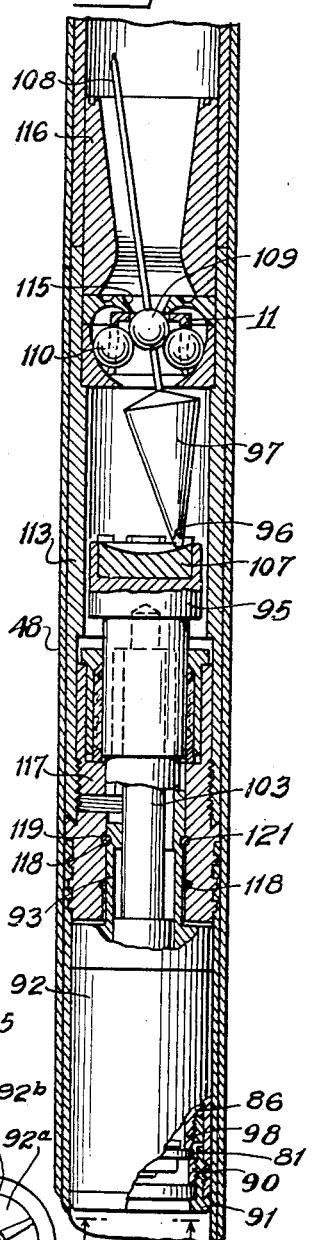
Fig. 11.
Fig. 12.
Alexander T. Cooper
and Lawrence F. Valentine  INVENTORS.
BY
ATTORNEY.

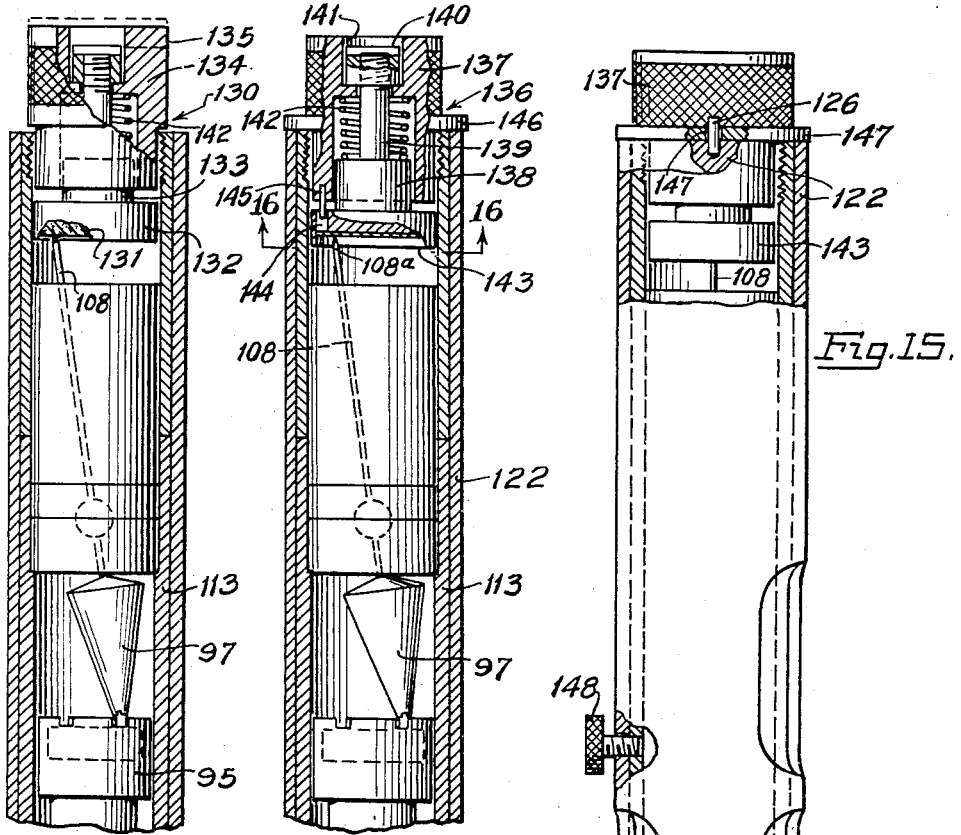
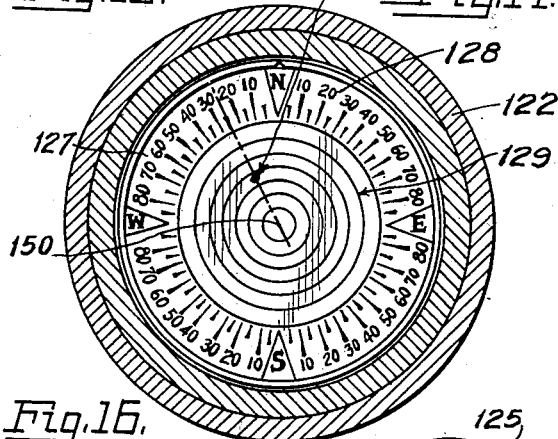
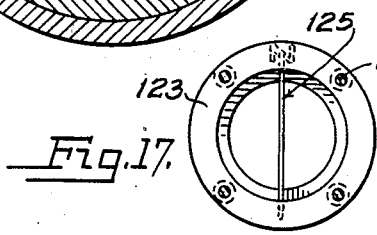

Patented Oct. 29, 1940

2,219,512

UNITED STATES PATENT OFFICE 2,219,512

DEVICE FOR SURVEYING DRILLED HOLES

Alexander T. Cooper and Lawrence F. Valentine, Long Beach, Calif.; said Cooper assignor of five per cent to James W. McCoy, Los Angeles, Calif.

Application March 21, 1938, Serial No. 197,188

15 Claims. (Cl. 33—205)

This invention relates to indicating and recording mechanisms, particularly to that class of mechanisms which are used in connection with the surveying of holes drilled into the earth.

In drilling bores for oil wells it is often difficult to maintain a perfectly straight and vertical hole. This difficulty usually arises as the drilling bit used in rotary drilling passes between stratifications of different formations. Upon moving from one formation to another there is a tendency for the drill bit to be deflected from the vertical, and to maintain such deviation and increase it as drilling proceeds. In many instances the lack of knowledge of the direction in which the hole is proceeding leaves the driller oblivious of the fact that the hole has deviated from the vertical which might cause the well to miss the oil sands, or possibly cause future legal difficulties.

Under other circumstances it is desired to purposely deviate from the vertical, as in directional drilling. But here again knowledge of the position of the hole is of paramount importance in order that procedure in drilling can be made in the right direction.

Heretofore, the extent of inclination of the hole from the vertical has been obtainable by the use of various devices, among which is the acid bottle and plumb bob. It is quite obvious that a mere indication of the deviation of the hole from the vertical fails to provide a true picture of the conditions of the hole. Not only should the inclination be known but the direction of the inclination; which when taken in conjunction with the depth of the bore will convey knowledge of the exact position of the hole to those interested.

Accordingly, it becomes an object of this invention to provide an improved surveying mechanism for holes drilled into the earth.

A further object of the invention resides in the provision of a bore surveying mechanism that will indicate the angle of inclination of a bore and also the direction of such inclination.

Yet a further object of the invention is to provide a bore surveying mechanism that obtains the inclination of a bore by means of gravity acting upon a suspended weight, and the direction of such inclination by means of a compass.

Another object of the invention includes the provision of a bore surveying mechanism that is automatic in its operation of locking an indicator in its inclined position and a compass in its indicating position with respect to the magnetic North or South; all of this being accomplished in a well or drilled hole so that the positions thus obtained can be recorded or otherwise noted when the instrument is removed from the hole.

Still another object of the invention involves a bore surveying mechanism which is automatically released for indicating purposes upon striking a relatively fixed object in the bore, the locking of the indicating elements being delayed by time control means to permit them to come to rest in accurate indicating positions.

Another object of the invention is to provide an indicating mechanism capable of determining both inclination and drift of a drilled hole, in which the indicating elements are protected by shock absorbing devices.

A further object of the invention involves an indicating mechanism in which the indicating part thereof is readily removable for noting the reading or for recording the same.

A further object of the invention lies in the use of an indicating mechanism having magnetic drift indicating means in conjunction with a non-magnetic sub or drill collar for preventing extraneous magnetic phenomena from interfering with accurate positioning of the indicator.

How these objects and others are obtainable will become apparent from the following description, reference being had to the accompanying drawings, in which:

Fig. 1 is a section taken through an inclined drilled hole, drill pipe, and sub or drill collar, illustrating the indicating device as it appears when entering the non-magnetic sub.

Fig. 2 is a section through the control and indicating portions of the mechanism shown in an inclined position, parts being shown in elevation.

Fig. 3 is a partially sectional view illustrating the general relationship of the indicating mechanism and its control parts, and the centering and shock absorbing elements on each end thereof.

Fig. 4 is a longitudinal sectional view through the trip release mechanism, shown in locked position.

Fig. 5 is a view similar to Fig. 4 showing the trip mechanism in released position.

Fig. 6 is an elevation of the latching members shown in Figs. 4 and 5.

Fig. 7 is a section taken along the line 7—7 of Fig. 6.

Fig. 8 is a section taken along the line 8—8 of Fig. 6.

Fig. 9 is a longitudinal section illustrating the time delay elements and compass housing.

Fig. 10 is a longitudinal section showing the details of the compass mechanism and plumb bob, both being shown in released position.

Fig. 11 is a view similar to Fig. 10 showing the compass and plumb bob in locked position.

Fig. 12 is a plan view as seen in the direction of the arrows 12—12 shown on Fig. 11.

Fig. 13 is a partially longitudinal section through the plumb bob housing with an inking device shown in position for applying ink to the stem of the plumb bob.

Fig. 14 is a view similar to Fig. 13 with a recorder attachment shown in place of the inker illustrated in Fig. 13.

Fig. 15 is an elevational view, partly in section, of the indicating portion of the mechanism with the recorder in place as in Fig. 14.

Fig. 16 is a section on an enlarged scale taken along the line 16—16 of Fig. 14; and Fig. 17 is a section taken along the line 17—17 of Fig. 15.

In its general aspects the invention contemplates the introduction of a go-devil into a bored hole to obtain both the inclination and drift of the hole at or near the bottom or at an intermediate part thereof. Upon striking a fixed object the indicating elements included in the invention will be locked in position so that the information will be retained for observance or recordation upon being removed from the hole.

The general arrangement of parts is illustrated in Figs. 1 and 3. The go-devil is insertible through a drill pipe 10 on a sand or wire line 11; or it may be dropped down the drill pipe, descending under the influence of gravity. The drill pipe is coupled to a non-magnetic or bronze sub or drill collar 12 which is threadedly attached to a drill bit 13. Extending across the sub or drill collar is the bridge piece 14 against which the lower end of the go-devil indicator is adapted to strike and come to rest. The indicator is held centered in the drill pipe or drill collar by means of the bowed springs 15, 16 carried adjacent the ends thereof. The lower set of springs 15 is attached at its ends to the collars 17, 18. The upper collar 17 has bearing thereagainst a coil spring 19, the upper end of which engages against the lower end of the housing 20 in which the entire indicator mechanism is slidably contained; while the lower collar 18 will rest upon a second helical spring 21, the other end of which engages against a tapered flange 22 formed upon the hollow sleeve 23 which is threaded to the tubular member 24, upon which the collars 17, 18 are slidable. The other end of the tubular member 24 is threaded to the stem 24a which is fixed by the pins 25, 26 to the cylindrical housing 20. In effect, parts 23, 24, 25 and 26 comprise a rigid unit slidably carrying the centering and shock absorbing springs 15, 19, 21 and the plunger 27 and coil spring 28, to be referred to later.

The bowed springs 15 and coil springs 19, 21, acting in conjunction therewith, function as a shock absorber for the lower end of the mechanism permitting the bowed springs to center the indicator in the drill pipe or drill collar. It will be readily apparent that the bowed springs may flex in either direction, their motion being restrained in a longitudinal direction only by the coil springs described.

The centering device at the upper end of the mechanism is essentially the same as at the lower end. It includes the bowed springs 16 attached at their ends to their respective collars 29, 30 slidably surrounding the tube 31 and having bearing at their respective ends the helical springs 32, 33; the end of the upper spring 32 engaging with the plug 34 threadedly connected with the tubular member 31 and the end of the other spring 33 engaging the collar 35 fixed by the pins 36 to the housing 20 containing the indicating mechanism A. This housing 20 is fixed to the tube 31 through the cooperating threads 37. The upper centering device acting in conjunction with the centering device at the lower end of the go-devil will maintain the indicating device coaxial with the hole 10 and will thereby permit of the obtaining of an accurate indication of both the inclination and direction drift of the hole.

As was aforementioned, the entire mechanism can be lowered on a wire or sand line 11. The end of this line is connected to the rod 38 terminating in the piston 39 slidably contained within the tubular member 31. Engaging with the respective faces of the piston 39 are the coil springs 40, 41 the other ends of which engage respectively with the plug 34 at the end of the go-devil and with the plug 42 threaded into the tubular member 31 at its lower end. Because of the double spring arrangement shown, a yieldable connection is provided between the sand line 11 and the go-devil proper permitting a restrained lost motion between the two, and thereby preventing sudden shocks from being transmitted from the sand line to the go-devil and its indicating mechanism.

A yieldable connection is also provided at the lower end of the go-devil to absorb the shock incident to its sudden coming to rest upon striking the bridge piece 14; or if a bridge piece is not used, against the bit 13; or against the hole bottom. The plunger 27, previously referred to, is slidably mounted within the sleeve 23, extending therefrom at its lower end and engaging the coil spring 28 at its upper end, the other end of the spring abutting against the plug part 43 of the stem 24a.

Upon striking the bridge piece 14 the plunger 27 will be brought to rest and will also result in the yieldable arresting of the tubular member 24 and the indicator housing 20. However, the indicator mechanism A contained within the housing will continue to move downwardly against the action of the spring 44, the end of the plunger 45 striking against the top 46 of the member 24a so as to move the trip release rod 47 upwardly. This rod 47 moves within the cylindrical housing 48 being guided by the bushing 49 that is threaded to the end closure 50 of the housing and which is threaded at its other end to a liner 51 whose upper end is threaded to the packing box 52 serving to guide a piston rod 53 therein. This piston rod is engaged by the packing 54 held in compression thereagainst by screwing upon the packing nut 55 threaded to the packing box 52.

The piston rod 53 just described is slidable within the trip rod 47, the two being held in slidable relation by means of the pins 56 on the piston rod engageable in the longitudinal slots 57 provided in the trip rod 47. The piston rod is normally held in a definite fixed position with respect to the sleeve liner 51 by means of a locking mechanism consisting of a plurality of locking dogs 58 pivoted to a piston 59 which is fixed to the piston rod 53. The dogs are normally urged outwardly by the leaf springs 60, one end of each of which is fixed to the piston rod and the other end to the pivoted dog, so that their locking noses 58a engage against the lower end 61 of the shoulder provided on a cylinder sleeve 62 which is threadedly fixed to the packing box 52. It is desired to release these dogs in order to obtain an indication on the indicating element of the instrument to be described hereinafter. In furtherance of this end the trip rod 47 is provided with an axially tapered cam 47a which upon upward movement of the trip rod (initiated by the plunger 27 striking the bridge piece 14) will move the cam upwardly from the position shown in Fig. 4 to the position shown in Fig. 5. Referring to this latter figure, it will be noted that the locking noses 58a of the pawls have been moved inwardly permitting the piston rod 53 to be moved upwardly under the influence of the helical spring 63 engaging against the lower end 64 of the piston 59 at one end and against the bushing 49 at its other end.

Further details of the locking mechanism are disclosed in Figs. 6, 7, and 8. As shown therein, the piston is provided with a plurality of slots 65 within which are positioned the locking dogs or pawls 58. Each pawl is pivoted to the piston by the fulcrum pin 66 and is adapted to extend outwardly through the slots in the piston to engage against the lower end 61 of the sleeve 62 when in locking position. The piston rod 53 is shown as being connected to the piston by means of the pin 67.

The piston rod having been released it can now move upwardly under the influence of the spring 63, but this action is restrained by a timing mechanism which will permit the indicating portions of the instrument to come to rest before they are locked in position. To accomplish this purpose, the intermediate part of the piston rod (see Fig. 9) above the packing box 52 has fixed thereto by the pin 68 a timing piston 69 operating in the oil filled cylinder 70. Oil, which is preferably aircraft compass fluid capable of flowing freely at low temperatures, is prevented from leaking around the periphery of the piston to the other side thereof by means of the cup-shaped packing 71 fixed thereon. However, clearance is provided between the piston rod 53 and timing piston 69 so as to allow oil to move along the rod to the other side of the piston. The flow of oil in this manner is restrained by the gauze packing 72 interposed between the piston and rod and also by the orifice plug 73 threaded to the piston and having its inner surface 74 frusto-conical in shape so as to provide a restricted passage delaying the movement of oil from the top side of the timing piston to the lower side thereof. By suitable design of the orifice plugs, and by using various clearances between the plug and piston rod, the time consumed by the oil in flowing from the top of the piston to the lower part thereof can be varied. It is usual for the displacement of oil to be restricted so as to allow the pistons 59, 69 and their associated parts to move upwardly about 1½ inches in about 45 seconds, although, as above indicated, this time can be varied, if desired. Although the oil cannot move from the top to the bottom of the piston around the periphery thereof because its pressure will expand the cup-shaped packing against the cylinder wall, yet whenever the piston rod is moved downwardly the oil will flow readily around the packing to the top of the piston since the pressure thus created will collapse the packing, moving it inwardly away from the cylinder wall.

The upper end of the piston rod 53 passes through the packing box 75 threaded to the cylinder sleeve 70 and having packing 76 sealing the piston rod against leakage by maintaining it under compression by means of the packing nut 77 surrounding the rod and threaded into the packing box. The upper end of the piston rod carries the piston 78 movable within the cylinder 79 attached to the packing box by the threads 80. This latter cylinder encloses the magnetic compass B to be described hereinafter, guiding it in its travel between locked and unlocked positions. At this point it can be stated that the upward motion of the piston rod 53 and piston 78 at its upper end serves the purpose of producing the locking of a magnetic compass which will indicate the direction of inclination of the hole relatively to the magnetic North or South, and will also lock an instrument indicating the extent of inclination of the hole. This mechanism will now be described, particular reference being had to Figs. 10 and 11.

The magnetic compass is in the form of a disk 81 fixed to the spindle 82 having bearing in the jewels 83, 84 at opposite ends thereof. The upper jewel 83 is held in the plug 85 which is threaded to a supporting member 86 threadedly carrying the skeletonized lower jewel bearing support 87. The ribs 88 of the skeleton frame 87 are slidably mounted in guide slots 89 provided in the annulus 90 threaded to the end portion 91 of the compass housing 92, and clamping therebetween the transparent window 92a made of glass or any other suitable material. The indication on the compass disk 81 can be observed through this window. The compass housing 92 is threaded to the end portion 91 and is also threaded to the stepped sleeve 93. At its upper end, the sleeve 93 engages with a coil spring 94, the other end of which contacts with a plumb bob locking piston 95, whose upper surface is concave, being adapted to engage an end 96 of a plumb bob to lock it in position. The locking action is performed whenever the stepped sleeve 93 is moved upwardly, acting through the coil spring 94 to move the plumb bob piston 95 upwardly until it contacts with the plumb bob.

Such upward movement of the stepped sleeve and plumb bob piston will also serve to lock the magnetic compass 81 in its indicated position. As the compass housing 92 and its end portion 91 move upwardly the annulus 90 will approach the compass disk 81, this action being permitted since the ribs 88 on the skeletonized jewel-bearing support will merely move relatively downwardly in the guide slots 89 provided in the annulus 90. Upon engaging the lower surface 81a of the compass disk, this latter member will move upwardly with the top surface of the annulus toward the upper locking member 98, being pressed thereagainst by the actions of the various springs 99, 100, 101, 102, disclosed, which springs permit upward movement of the upper locking member 98 while yieldingly forcing it against the compass disk. The upward motion of the upper locking member 98 is assisted by the rod 103 threaded to the plumb bob piston 95 and slidably within the stepped sleeve 93. At the lower end of this rod, a smaller rod 104 is threaded thereto, its motion being imparted to the upper locking member through the spring 100, but which motion is resisted by the spring 99. Further yieldability and shock cushioning is obtainable by holding the upper locking member in balanced position with respect to the jewel-bearing support 86 by means of the springs 101, 102. Leakage of lubricant between the rod 103 and the sleeve 93 and into the compass mechanism is prevented by means of the packing 105 compressed by the packing nut 106.

By the arrangement just disclosed it will be noted that the lower locking annulus 90 moves upwardly a much greater distance than the upper locking member 98. This difference in motion is permitted by the springs 94 and 100. Therefore, locking of the magnetic compass is obtainable; and also unlocking thereof whenever the stepped sleeve 93 and parts affixed thereto, are moved downwardly.

As aforementioned, the plumb bob 97 is substantially simultaneously locked in position by engagement of the plumb bob piston 95 with the plumb bob. In order to ensure locking and no slipping after contact between the piston and plumb bob, a duraluminum insert 107 is placed in the piston for engagement with the ribbed end nose 96 on the end of the plumb bob. The surface of the piston is a portion of a sphere struck from the pivotal center of the plumb bob. The plumb bob is provided with a stem 108 having a sphere 109 as an intermediate portion mounted for universal movement upon its spherical bearing balls 110 held within the bearing cage 111. The bearing balls are rideable upon the race way 112 held within the plumb bob housing portion 113 of the instrument. The plumb bob and the bearing race are maintained in assembled relationship by means of the ring 114, the tapered extension 115 of which can engage with the spherical supporting portion 109 of the plumb bob to prevent its axial displacement. These parts are further held in assembly by the fluted sleeve 116 within the plumb bob housing.

The plumb bob housing 113 is threadedly connected with the outer sleeve 117 surrounding the stepped sleeve 93 and rod of the locking mechanism previously described. This sleeve 117 is in turn threadedly connected to the cylinder 79 within which the piston 78 mounted on the upper end of the piston rod 53 rides.

As this latter piston 78 moves upwardly in relatively slow motion because of the action of the timing piston 69 it will compress air between it and the compass window 92a in the compass device. As the air is compressed it will move the end portion 91, compass housing 92, stepped sleeve 93, plumb bob 95, etc., upwardly in the manner hereinbefore described to lock the compass and plumb bob in indicating positions. This locking action will continue until the parts are released. That is, the parts have a locked position and an unlocked position, and they will be held in either of them. To accomplish this purpose, the stepped sleeve 93 is provided with an external circumferential groove 118, and the sleeve 117 connecting the plumb bob housing with the compass housing is provided with an inner circumferential groove 119 at an upper portion and a circumferential shoulder 120 near its lower end. A snap ring 121 is held within the groove 118 in the stepped sleeve. It will engage with either the shoulder 120 to hold the parts in unlocked position as shown in Fig. 10; or upon upward movement of the sleeve the ring will snap into the inner circumferential groove 119, as shown in Fig. 11, to hold the parts in locked position. Because of this latter condition the parts will° remain locked until purposely unlocked, without regard to the subsequent positions of the piston rod 53 and piston 78, or any of the other operating parts of the mechanism.

The plumb bob and compass having been locked in their respective indicating positions, the entire go-devil indicator can then be removed through the drill pipe by raising the wire line 11; or in the event that a wire line is not used, a suitable overshot can be lowered through the drill pipe to be coupled to the go-devil for its removal; or further still the entire drill pipe can be raised to the surface, whereupon the indicator mechanism can be readily removed therefrom.

Upon arriving at the surface the indicator mechanism A will be removed from the housing 20 and the indicating parts of this mechanism can be removed from the compressed air cylinder 79 by unscrewing the square-threaded sleeve 117 from the cylinder. The indications obtained are then observable by looking through the compass window 92a and noting the position of the compass arrow 92b, which will indicate the direction of the magnetic North pole while in the hole; and the upper stem of the plumb bob can be viewed to note the extent of inclination from the vertical, if any. However, it is desirable to retain a permanent record both of the inclination and drift and this object can be attained by means of the mechanisms now to be described (see Figs. 13 to 17).

A cylinder 122 is provided of substantially the same axial extent as the indicating mechanism removed from the air cylinder. This cylinder includes a bottom end plate 123 fixed to it by means of screws 124 and carrying a fine wire 125 stretched diametrically across its opening, one end of this wire being labeled "N" as shown in Fig. 17. On the same side of the cylinder at its top and in the same plane with the fine wire, a pin 126 is inserted into the cylinder. In order to obtain a reading, the indicating elements (including the compass and plumb bob) are inserted into the cylinder 122 with the locked compass arrow 92b in alignment with the fine wire 125 and pointing towards the North end of that wire as indicated by the letter N. The parts are now in position for obtaining a record upon the chart or disk 127, shown on an enlarged scale in Fig. 16. It will be noted that the outer circumference 128 of the chart is divided into indications similar to that normally used in connection with a compass. That is, the chart includes the usual North, East, South, and West directions with the intervening spaces being divided into degrees. In addition, concentric circles 129 are printed on the chart which will serve to indicate the degrees of inclination of the bore as determined by the plumb bob.

Prior to the printing of the record upon the chart or disk, the upper end of the plumb bob stem 108 is inked by use of the inker 130 shown in Fig. 13. This inking mechanism includes an ink pad 131 supported in the holder 132 whose stem 133 extends into the hollow sleeve 134. The stem 133 is yieldably held in the sleeve by means of the spring (not shown) bearing thereagainst in order that the inker may be prevented from applying an excess of pressure to the plumb bob stem during the inking operation. For greater facility in inserting and removing the inker into and from the indicating mechanism the outer surface 135 of the sleeve 134 is knurled to provide a greater gripping capacity by an operator's fingers.

After the stem 108 has been inked, the inker is removed and the recording device 136 inserted in its place. In its general mechanical features this recorder is essentially the same as the inker. That is, the sleeve 137 supports the holder 138 for the disk 127 by means of the holder stem 139 extending through the upper end of the sleeve and there carrying the nut 140 in the sleeve socket 141. The coil spring 142 yieldingly presses against the holder 138 so as to yieldingly press the disk or chart 127 against the plumb bob stem. However, to obtain a proper record, the disk 127 must be inserted in the indicating mechanism in proper position. To insure that this will occur the flanged portion 143 of the holder 138 is provided with a socket 144 receiving the pin 145 extending from the sleeve 137. The north, or N indication, on the chart is aligned with this pin 145. The sleeve further carries a flange 146 having a hole 147 therethrough lying in the same plane as the pin 145. The chart having been placed in the holder in proper position with respect to the pin the recording device is then inserted within the indicating mechanism which has previously been inserted within the cylinder 122 and locked thereto by the thumb screw 148. The hole 147 in the recorder flange is placed over the upper pin 126 in the cylinder 122. It has been previously stated that the indicator has been inserted within the sleeve so that its north indicating arrow 92b is in alignment with the cylinder wire 125 and pointing towards the N end thereof, and that this wire is in alignment with the pin 126 at the upper end of the cylinder. The insertion of the recorder device so that its hole 147 is placed over this pin 126 results in a north alignment of the compass arrow and the N mark on the recorder disk. Pressure upon the recorder sleeve 147 will cause the disk 127 to be forced against the inked end 108a of the plumb bob stem 108, placing a dot 149 upon the disk or chart.

From the foregoing, it will be apparent that the north end of the locked compass is aligned with and points in the same direction as the north end of the wire 125. Similarly, the socket 144, pin 145, hole 147, and pin 126 are all in alignment with the north end of the wire 125 and on the same side of the cylindrical container 122 as the north ends of both the compass and wire. Therefore, if the north indication on the chart is placed adjacent the socket 144, it must be in alignment with and facing in the same direction as the north end of the locked compass.

Prior to locking of the compass and plumb bob while the instrument was in the bore hole, the plumb bob stem 108 would point in the direction of inclination of the hole, due to the universal pivot provided as its mounting. The plumb bob 97 will have swung in a direction opposite to that of the hole inclination. Accordingly, the locking of the plumb bob and compass means that the stem 108 is oriented with respect to the N indication on the chart in precisely the same manner as it is oriented with respect to the N pointer of the compass, provided that the N chart indication is aligned with and points in the same direction as the compass, upon the parts being assembled in the cylindrical container 122.

An accurate mark will be made on the chart provided that the chart is placed in the record holder with its indications facing upwards, or away from the stem 108. However, should the chart be placed so that its lines and indicia face downwardly, or towards the stem 108, the E and W indications should be interchanged from the showing of Figure 16, in order to obtain a direct and true record indication of the direction of inclination.

Removal of the recorder will now permit observance of the record thus obtained. The radial distance of the dot 149 from the center 150 of the chart will indicate the degree of inclination of the bore hole. A radial line 151 drawn from the center of the chart through the dot and extending to the compass degree indications 128 around the outer part of the chart will provide an indication of the direction of this inclination with respect to the magnetic poles of the earth. The record thus obtained can be properly identified on the reverse side thereof and kept for future reference.

The invention thus provides a manner of obtaining both the inclination and direction of inclination of a drilled hole. The obtaining of a reading within a non-magnetic drill collar or sub ensures that a true compass reading will result. The centering springs may be readily replaced with springs of different dimensions making the instrument easily adaptable for use in different sizes of drill pipes and collars. After obtaining a record on the chart, the mechanism can be reset by pulling down upon the compass housing 92 thereby releasing the compass and plumb bob from locked positions. The timing piston 69, air piston 78, and locking dogs 58 may be moved to their initial positions by pulling down upon the trip rod 47, the ends of its slots 57 engaging with the piston rod pins 56 to move the pistons and locking dogs into their original positions. The locking and indicating portions of the mechanism are now in condition for obtaining another indication of both the inclination and direction of drift of the same hole or of another hole.

While we have described our invention with particular reference to the embodiment shown on the drawings it is to be understood that such disclosure is only illustrative of the invention and is not to be considered as conferring any limitations thereupon nor upon the mode of operation; the scope of invention being best defined in the claims appended hereto.

We claim:

1. In a surveying apparatus in which an indication of the extent of inclination of a hole is obtained by locking a plumb bob in its indicating position and an indication of the direction of such inclination is obtained by locking a compass indicator in its indicating position; the combination of a container for said plumb bob and compass, said container having reference means alignable with the compass indicator, a recorder having reference means corresponding with said container reference means whereby engagement of said recorder with said plumb bob produces a record indication of the inclination and direction of inclination of said hole on said recorder.

2. In a surveying apparatus in which an indication of the extent of inclination of a hole is obtained by locking a plumb bob in its indicating position and an indication of the direction of such inclination is obtained by locking a compass indicator in its indicating position; the combination of a container adapted to receive said plumb bob and compass, said container having reference means at one end thereof adapted to be aligned with the compass indicator adjacent said end, a recorder having reference means corresponding with said container reference means, and means at the other end of said container aligning said recorder and container reference means whereby engagement of said recorder with said plumb bob produces a record indication of the inclination and direction of inclination of said hole on said recorder.

3. A surveying apparatus as defined in claim 2, wherein means is provided for locking said plumb bob and compass in said container.

4. A surveying apparatus including a plumb bob, a compass, means engageable with said compass for locking it in indicating position, means engageable with said plumb bob for locking it in indicating position, means for moving said compass locking means toward its engaging position, and a yieldable connection between said respective locking means through which movement of said compass locking means produces movement of said plumb bob locking means toward its engaging position.

5. A surveying apparatus including a plumb bob, a compass, a housing surrounding said compass, means carried by said housing and engageable with said compass for locking it in indicating position, means engageable with said plumb bob for locking it in indicating position, means for moving said housing and its locking means toward its engaging position with said compass, and a yieldable connection between said housing and plumb bob locking means for transmitting the motion of the housing to the plumb bob locking means and move it toward its engaging position with said plumb bob.

6. A surveying apparatus including a plumb bob, a compass, a housing surrounding said compass, means carried by said housing and engageable with said compass for locking it in indicating position, a piston engageable with said plumb bob for locking it in indicating position, means for moving said housing and its locking means toward its engaging position with said compass, and means including a yieldable connection for transmitting motion of said housing to said piston for engaging the latter with said plumb bob.

7. A surveying apparatus including a plumb bob, a compass, a housing surrounding said compass, a locking member carried by said housing and engageable with one side of said compass, a second locking member engageable with the other side of said compass, a piston engageable with said plumb bob for locking it in indicating position, means for moving said housing and its locking member toward engagement with said compass, means for transmitting motion of said housing to said piston for engaging the latter with said plumb bob, and means yieldably supporting said second locking member from said piston to permit its engagement with the other side of said compass.

8. A surveying apparatus including a plumb bob, a compass, a piston engageable with said plumb bob for locking it in indicating position, means for yieldably supporting said compass from said piston, a first locking member engageable with one side of said compass, a second locking member engageable with the other side of said compass, means for moving said first locking member toward engagement with said compass, and means for transmitting such motion to said piston for engaging it with said plumb bob, said yieldable means permitting said first locking member to move said compass toward engagement with said second locking member.

9. A surveying apparatus including a plumb bob, a compass, a piston engageable with said plumb bob for locking it in indicating position, a rod extending from said piston, means yieldably supporting said compass from said rod permitting movement of said compass to and from said plumb bob, a first locking member engageable with one side of said compass, a second locking member yieldably supported by said rod and engageable with the other side of said compass, means for moving said first locking member toward engagement with said compass, and means for transmitting such motion to said piston for engaging it with said plumb bob, said yielding means permitting said first locking member to move said compass toward engagement with said second locking member.

10. A surveying apparatus including a plumb bob pivotally mounted in a housing, a compass contained within a second housing, relatively slidable sleeves attached to each housing, means operable upon movement of said compass housing with respect to said plumb bob housing for selectively locking or unlocking said plumb bob and compass in respective indicating positions, and retainer means between said sleeves for maintaining said housings in locked or unlocked relative positions.

11. A surveying apparatus including a plumb bob pivotally mounted in a housing, a sleeve extending from said housing, a compass contained within a second housing having a sleeve slidable within said other sleeve, means carried by said compass housing for locking said compass in indicating position, a piston within said plumb bob housing for locking said plumb bob in indicating position, said compass housing being movable to and from said plumb bob housing to lock and unlock said compass, means for transmitting movement of said compass housing to said piston for producing corresponding locking and unlocking of said plumb bob, and retainer means between said sleeves for selectively maintaining said housings in locked or unlocked positions.

12. A surveying apparatus including a cylinder, a plumb bob, a housing containing said plumb bob, a compass, a housing containing said compass, means for locking said plumb bob and compass in respective indicating positions, means connecting said housings for movement with respect to each other, means detachably securing one of said housings to said cylinder, the other of said housings being slidable within and on said cylinder to operate said locking means.

13. A surveying apparatus including a cylinder, a plumb bob, a compass, a housing detachably secured to said cylinder and containing said plumb bob, a housing for said compass slidable within and on said cylinder for movement with respect to said plumb bob housing, means carried by said compass housing and operable by its movement for locking said plumb bob and compass in indicating positions, and means for selectively retaining said housings together in relative locked or unlocked positions for removal as a unit from said cylinder.

14. In a surveying apparatus in which an indication of the extent of inclination of a hole is obtained by locking a plumb bob in its indicating position and an indication of the direction of such inclination is obtained by locking a compass indicator in its indicating position; the combination of a container adapted to receive said plumb bob and compass, said container having reference means alignable with the North indication of the compass, a chart having compass indicia and inclination indicia thereon, means on the container for aligning the North indication on the chart with the North indication of the compass, and means for engaging said chart with said plumb bob to produce a record indication on said chart of the inclination of the hole and direction of such inclination.

15. In a surveying apparatus in which an indication of the extent of inclination of a hole is obtained by locking a plumb bob in its indicating position and an indication of the direction of such inclination is obtained by locking a compass indicator in its indicating position; the combination of a container adapted to receive said plumb bob and compass, said container having reference means at one end thereof alignable with the North indication of the compass adjacent said end, a chart having compass indicia and inclination indicia thereon, reference means at the other end of said container in alignment with the North indication of said compass, means for aligning the North indication of the chart with said last-mentioned means, and means for engaging said chart with said plumb bob to produce a record indication thereon of the inclination of the hole and the direction of such inclination.

ALEXANDER T. COOPER.
LAWRENCE F. VALENTINE.